(12) United States Patent
Brocke et al.

(10) Patent No.: US 11,891,080 B2
(45) Date of Patent: Feb. 6, 2024

(54) AGRICULTURAL TRACTOR HAVING A SYSTEM FOR IDENTIFYING DOWNSTREAM ROAD USERS

(71) Applicant: DEERE & COMPANY, Moline, IL (US)

(72) Inventors: Stefan Brocke, Mannheim (DE); Norbert Fritz, Ilvesheim (DE)

(73) Assignee: DEERE & COMPANY, Moline, IL (US)

(*) Notice: Subject to any disclaimer, the term of this patent is extended or adjusted under 35 U.S.C. 154(b) by 324 days.

(21) Appl. No.: 17/303,527

(22) Filed: Jun. 1, 2021

(65) Prior Publication Data
US 2021/0394777 A1 Dec. 23, 2021

(30) Foreign Application Priority Data
Jun. 23, 2020 (DE) .................... 102020207777.0

(51) Int. Cl.
*B60W 50/14* (2020.01)
*B60W 60/00* (2020.01)
(Continued)

(52) U.S. Cl.
CPC ............... *B60W 50/14* (2013.01); *B60S 1/04* (2013.01); *B60S 1/52* (2013.01); *B60S 1/56* (2013.01);
(Continued)

(58) Field of Classification Search
CPC ............... B60W 50/14; B60W 60/001; B60W 2050/146; B60S 1/04; B60S 1/52; B60S 1/56
See application file for complete search history.

(56) References Cited

U.S. PATENT DOCUMENTS 6,693,524 B1 2/2004 Payne
8,733,242 B2 5/2014 Viaud
(Continued)

FOREIGN PATENT DOCUMENTS

DE 102008039649 A1 * 4/2009 ............... B60R 1/00
EP 3125061 A1 2/2017
(Continued)

OTHER PUBLICATIONS

"Encapsulation resin provides automotive sensor protection" Paul Boughton, EngineerLive, Jun. 10, 2015; downloaded from https://www.engineerlive.com/content/encapsulation-resin-provides-automotive-sensor-protection (Year: 2015).*
(Continued)

*Primary Examiner* — Peter D Nolan
*Assistant Examiner* — Tanya C Sienko
(74) *Attorney, Agent, or Firm* — Taft Stettinius & Hollister LLP; Stephen F. Rost

(57) ABSTRACT

An agricultural tractor with a system for identifying downstream road users includes a control unit in communication with a user interface, and a sensor having a detection range which runs in a vicinity of a ground and which is in a direction of an attachment connected to the agricultural tractor. The sensor is configured to identify a vehicle located in the detection range or which enters therein, and then generates a corresponding message signal which is supplied to the control unit. The control unit activates the user interface based on the message signal for the output of a driver message. A free region visible from the agricultural tractor by the sensor is formed between a road surface and a lower contour of the attachment facing the road surface.

16 Claims, 2 Drawing Sheets

(51) Int. Cl.
*B60S 1/04* (2006.01)
*B60S 1/52* (2006.01)
*B60S 1/56* (2006.01)

(52) U.S. Cl.
CPC ..... *B60W 60/001* (2020.02); *B60W 2050/146* (2013.01)

(56) References Cited

U.S. PATENT DOCUMENTS

| | | | |
|---|---|---|---|
| 8,960,085 | B2 | 2/2015 | Smith et al. |
| 9,154,746 | B2 | 10/2015 | Kageta |
| 9,554,098 | B2 | 1/2017 | Casper et al. |
| 2011/0191001 | A1 | 8/2011 | Viaud |
| 2013/0038731 | A1 | 2/2013 | Brey et al. |
| 2013/0293712 | A1 | 11/2013 | Turner et al. |
| 2019/0322245 | A1* | 10/2019 | Kline ............... B60S 1/0848 |
| 2020/0039483 | A1* | 2/2020 | Nemeth ............ G08G 1/167 |

FOREIGN PATENT DOCUMENTS

| | | |
|---|---|---|
| EP | 3352037 A1 | 7/2018 |
| EP | 3572897 A1 | 11/2019 |
| EP | 3815975 A1 | 5/2021 |
| JP | 2019175254 A | 10/2019 |
| WO | WO2020044802 A1 | 3/2020 |

OTHER PUBLICATIONS

"Sensor Mounting Considerations" by Andrew Waught, MachineDesign, Jun. 26, 2015; downloaded from https://www.machinedesign.com/automation-iiot/sensors/article/21834290/sensor-mounting-considerations (Year: 2015).*

Machine translation of DE102008039649 downloaded from IP.com Jun. 12, 2023 (Year: 2023).*

European Search Report issued in European Patent Application No. 21178126.5, dated Nov. 17, 2021, 8 pages.

* cited by examiner

AGRICULTURAL TRACTOR HAVING A SYSTEM FOR IDENTIFYING DOWNSTREAM ROAD USERS

RELATED APPLICATIONS

This application claims priority to German Patent Application No. 102020207777.0, filed Jun. 23, 2020, the disclosure of which is hereby expressly incorporated by reference in its entirety.

FIELD OF THE DISCLOSURE

The present disclosure relates to an agricultural tractor having a system for identifying downstream road users.

BACKGROUND

An agricultural tractor is a vehicle which combines high tractive power with relatively low travel speeds in order to tow attachments hitched thereto or to supply the attachments with drive power via a power take-off shaft. These attachments exist in a plurality of embodiments for the various tasks of field cultivation and for carrying out construction works.

In addition, agricultural tractors also carry out transport journeys on public roads, for example, between the farm and the field to be cultivated.

At the same time, the increase in performance of modern agricultural tractors is resulting in increasingly large attachments. If these attachments are located in the rear region of the agricultural tractor, for example, on a three-point power lift or a further trailer hitch, this leads to undesired blind spots which are not visible to the driver or only with difficulty by turning the head or via the rear view mirror. In particular, therefore, road vehicles which follow on the same travel lane may not be easily perceived by the driver. This applies primarily in the case of large-volume self-loading forage boxes or cultivation devices which are connected in the rear region, such as field sprayers or seeders which have a protruding folding boom.

This being the case, systems for use in agricultural tractors and comprising a camera which is connected in the rear region of the attachment are known, the blind spot being detected and displayed thereby via a screen in a driver's cab of the agricultural tractor. Such systems, however, require each attachment to be equipped with an individual camera, wherein this camera has to be additionally connected to the system component on the tractor side via an interface which also has to be provided.

In this regard, there is a requirement for a system for identifying blind spots which is improved or simplified relative to its usability.

SUMMARY

According to the present disclosure, the agricultural tractor has a system (assistance system) comprising a sensor which has a detection range which runs in the vicinity of the ground and which is in the direction of an attachment which may be connected to the agricultural tractor, wherein the sensor is configured to identify a vehicle which is located in the detection range or which enters therein, and to generate a corresponding message signal which is supplied to a control unit which activates a user interface in accordance with the message signal for the output of a driver message. A vehicle following the vehicle combination, which is formed from the agricultural tractor and the attachment, may thus be reliably identified for the purpose of the output of a suitable driver message.

In the case of an attachment which is connected to the agricultural tractor, the present disclosure makes use of the fact that a free region, which is visible from the agricultural tractor by the sensor, is formed between the road surface and a lower contour of the attachment facing the road surface. In the case of a towed trailer, the height of the free region depends primarily on the tire diameter thereof or in the case of a cultivation device connected to a three-point power lift, on the position thereof in the raised transport position. The sensor is, for example, a radar sensor or an image-forming sensor in the form of a camera or the like, the detection range thereof being oriented (relative to the forward direction of travel) to the rear in the direction of the attachment. In this case, the sensor may be connected to a lower face of a load-bearing structure of the agricultural tractor. In particular, a positioning below the rear axle of the agricultural tractor may have advantages. The use of a radar sensor makes it possible that, even when connected above the free region (i.e., if the attachment obstructs a direct emission of the sensor), a downstream vehicle may be detected by reflections which occur between the boundary surfaces formed by an attachment structure and the road surface. In such a case, the free region is at least indirectly visible to the sensor.

A particular advantage of the system according to the present disclosure is that all of the components are assigned to the agricultural tractor. Thus, these components may be used with any attachments without the need for retrofitting.

It is also conceivable that when the driver message is output (i.e., the activation of the user interface) the control unit takes into consideration the current driving dynamics of the agricultural tractor, in particular the travel speed and the direction of travel (steering angle) thereof and also the driving dynamics of the downstream vehicle, in particular the relative position thereof relative to the agricultural tractor, including the attachment and the travel speed thereof.

Since the sensor is subject to the risk of increased contamination when it is connected in the vicinity of the ground, a cleaning device may also be present. This cleaning device comprises a wiper or a high-pressure nozzle for ejecting an air stream or liquid stream onto an active surface of the sensor. The liquid stream in the simplest case is water to which a washing solution is optionally added. The cleaning process is automatically initiated by the control unit, by the actuation of the cleaning device as soon as an impairment to the quality of the sensor data is able to be established.

A mechanical protection may also be present in the form of a shield surrounding the sensor. This shield prevents potential damage to the sensor when traveling over obstacles or due to soil flung up during the field cultivation.

The connecting point of the sensor may also be of variable configuration so that different trailer hitches and thus different installation situations may be taken into account.

The user interface is configured for the output of visual or acoustic information. In particular, this user interface may have a touch-sensitive operating surface so that this operating surface forms at the same time an input unit via which a configuration of the system may be undertaken by the driver regarding the type of driver message to be output and also an activation or deactivation of the system.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
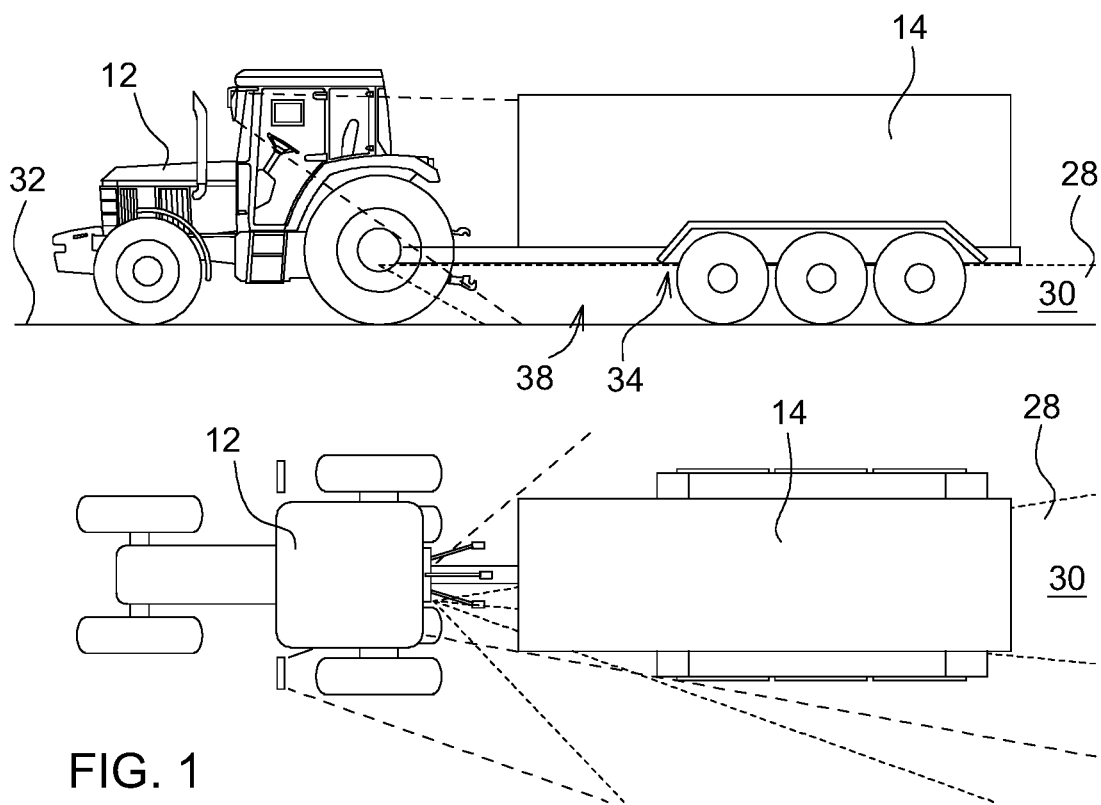
FIG. 1 is an embodiment of an agricultural tractor provided with the system according to the present disclosure with a transport trailer connected thereto.
Figure 2:
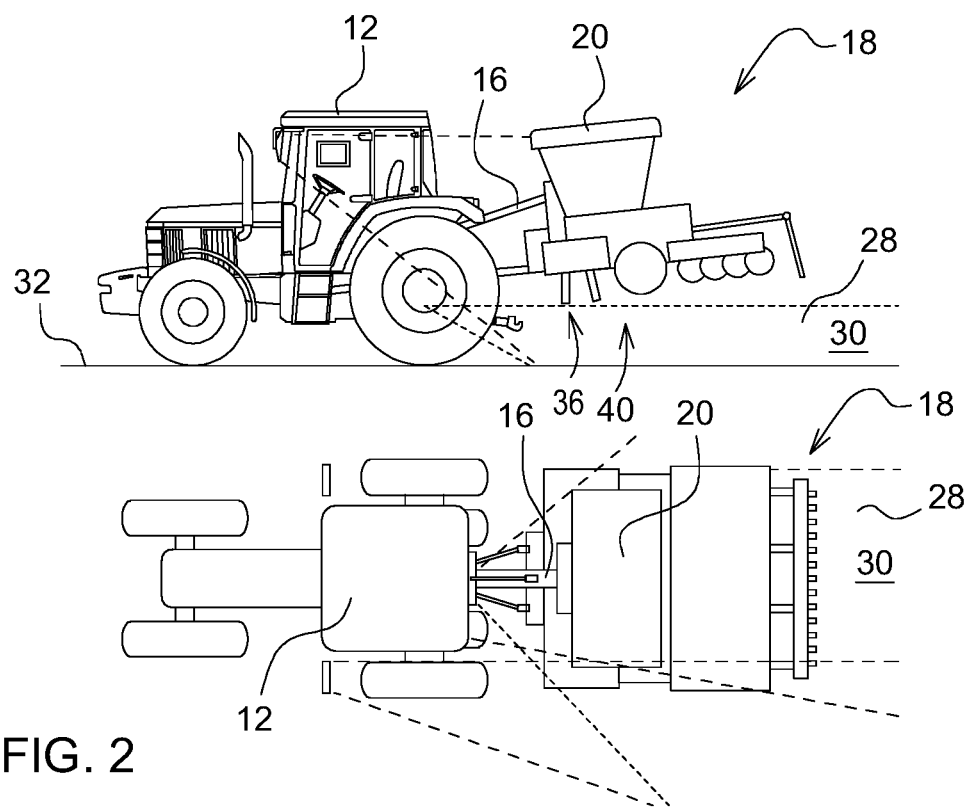
FIG. 2 shows the agricultural tractor shown in FIG. 1 in the case of a cultivation device in the form of a seeder connected to a three-point power lift.
Figure 3:
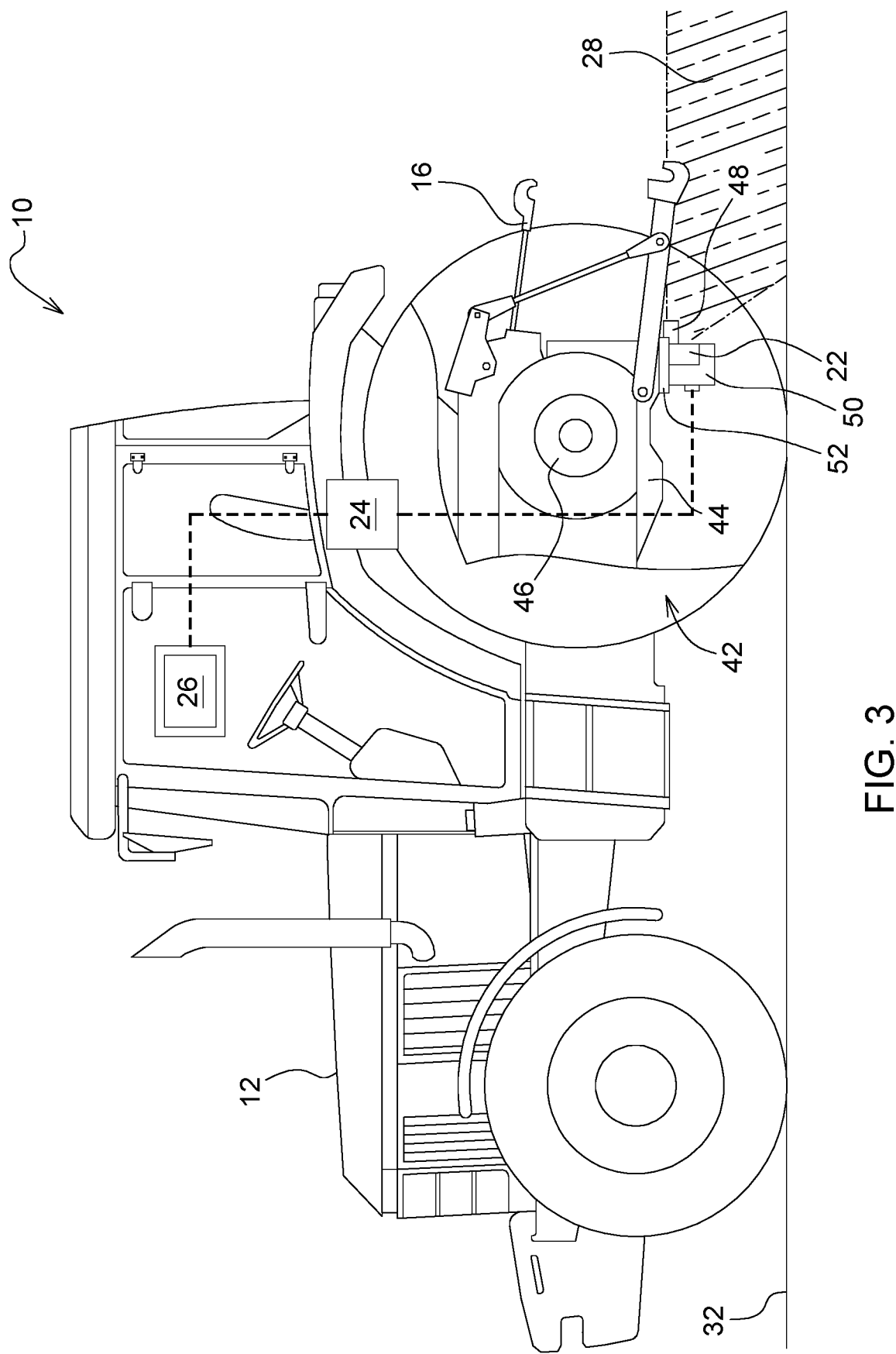
FIG. 3 shows a schematically shown embodiment of the system according to the present disclosure.

FIGS. 1 and 2 show in each case an embodiment of an agricultural tractor 12 provided with the system 10 according to the present disclosure according to FIG. 3 relative to various attachment situations, more specifically a transport trailer 14 (FIG. 1) connected thereto or a cultivation device 18 in the form of a seeder 20 (FIG. 2) connected to the three-point power lift 16.

The system 10 shown in FIG. 3 comprises a sensor 22, a control unit 24 for evaluating the sensor data and a user interface 26 which may be activated by the control unit 24 for the output of driver messages. The sensor 22 has a detection range 28 which runs in the vicinity of the ground and which is in the direction of the attachment 14, 18 which is respectively connected to the agricultural tractor 12. The sensor 22 is configured to identify a vehicle 30 (see FIGS. 1 and 2) which is located in the detection range 28 or which enters therein, and to generate a corresponding message signal which is supplied to the control unit 24 which then activates the user interface 26 in accordance with the message signal for the output of a suitable driver message.

The exact path of the detection range 28 of the sensor 22 is illustrated by way of example in FIGS. 1 and 2. A free region 38, 40, which is visible from the agricultural tractor 12 by the sensor 22, is formed between a road surface 32 and a lower contour or surface 34, 36 of the attachment 14, 18 facing the road surface. In the case of the towed trailer 14, the height of the free region 38, 40 depends primarily on the tire diameter thereof or in the case of the cultivation device 18 connected to the three-point power lift 16, on the position thereof in the raised transport position. The height of the free region 38, 40 typically lies in the region of up to 0.5 meters, but in principle even a few centimeters are sufficient in order to identify by the sensor 22 a vehicle 30 downstream of the agricultural tractor 12. In particular, in the case of the trailer 14 connected to the agricultural tractor, such ratios are produced when components in the form of a compressed air reservoir of a braking system or the like are installed on a lower face of the trailer and thus limit the useable detection range of the sensor 22.

As may be derived from the plan views in FIGS. 1 and 2, the sensor 22 permits the detection of a road region which is to the rear of the attachment 14, 18 and which is not visible to the driver (in particular via the side mirrors).

The sensor 22 is a radar sensor or an image-forming sensor 22 in the form of a camera or the like. The detection range 28 may be oriented to the rear in the direction of the attachment 14, 18. The sensor 22 in this case is connected to a lower face 42 of a load-bearing structure 44 or chassis of the agricultural tractor 12. More specifically, this sensor is positioned below the rear axle 46 of the agricultural tractor 12.

Also present are a cleaning device 48 having a wiper or a high-pressure nozzle for ejecting an air stream or liquid stream onto an active surface of the sensor 22 for removing any debris or dirt therefrom, a mechanical protection 50 in the form of a shield surrounding the sensor 22 and a mount 52 for connecting the sensor 22 to the load-bearing structure 44 of the agricultural tractor 12.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An agricultural tractor having a system for identifying downstream road users, comprising:
    a control unit in communication with a user interface;
    a sensor having a detection range which runs in a vicinity of the ground and which is in a direction of an attachment connected to the agricultural tractor, the sensor configured to identify a vehicle located in the detection range or which enters therein, the sensor configured to generate a corresponding message signal which is supplied to the control unit, and the control unit activating the user interface based on the message signal for the output of a driver message;
    wherein a free region which is visible from the agricultural tractor by the sensor is formed between a road surface and a lower contour of the attachment facing the road surface;
    wherein the sensor is coupled to a load-bearing structure of the agricultural tractor, and
    wherein the sensor is located below a rear axle of the agricultural tractor.

2. The agricultural tractor of claim 1, wherein the sensor comprises a radar sensor.

3. The agricultural tractor of claim 1, wherein the sensor comprises an image-forming sensor.

4. The agricultural tractor of claim 1, wherein the sensor comprises a camera.

5. The agricultural tractor of claim 1, wherein the attachment comprises a transport trailer or cultivation device.

6. The agricultural tractor of claim 1, wherein the sensor is coupled to a lower face of the load-bearing structure.

7. The agricultural tractor of claim 1, further comprising a mount for coupling the sensor to the load-bearing structure.

8. The agricultural tractor of claim 1, further comprising a shield for at least partially surrounding the sensor.

9. The agricultural tractor of claim 1, further comprising a cleaning device including a wiper or nozzle for removing any dirt or debris from the sensor.

10. An agricultural tractor for operating along a ground surface, comprising:
    a chassis supported by one or more wheels;

an attachment coupled to the chassis;
a control unit for controlling the tractor;
a user interface in communication with the control unit, the user interface configured to output operator messages from the control unit;
a sensor coupled to the chassis and disposed in communication with the control unit, the sensor configured to sense a detection range defined along the ground surface and in a direction towards the attachment;
wherein during use, the sensor is configured to detect an object entering the detection range and generate a signal to the control unit indicative of the object;
wherein upon receiving the signal from the sensor, the control unit operably activates the user interface to output a message based on the signal;
wherein the sensor operably senses a free region within the detection range, the free region being defined between the ground surface and a lower surface of the attachment;
wherein the sensor is coupled to a load-bearing structure of the agricultural tractor; and
wherein the sensor is located below a rear axle of the agricultural tractor.

11. The agricultural tractor of claim 10, wherein the sensor comprises a radar sensor or an image-forming sensor.

12. The agricultural tractor of claim 10, wherein the sensor comprises a camera.

13. The agricultural tractor of claim 10, wherein the attachment comprises a transport trailer or cultivation device.

14. The agricultural tractor of claim 10, wherein the sensor is coupled to a lower face of the load-bearing structure.

15. The agricultural tractor of claim 10, further comprising a mount for coupling the sensor to the load-bearing structure.

16. An agricultural tractor for operating along a ground surface, comprising:
a chassis including a mount;
a plurality of wheels supporting the chassis above the ground surface, where at least two of the plurality of wheels defines a rear axle of the tractor;
an attachment coupled to the chassis;
a control unit for controlling the tractor;
a user interface in communication with the control unit, the user interface configured to output operator messages from the control unit;
a sensor coupled to the chassis via the mount and being located below the rear axle, the sensor configured to sense a detection range defined along the ground surface and in a direction towards the attachment;
a shield surrounding the sensor; and
a cleaning device for operably cleaning the sensor from any dirt or debris;
wherein, during use, the sensor is configured to detect an object entering the detection range and generate a signal to the control unit indicative of the object;
wherein, upon receiving the signal from the sensor, the control unit operably activates the user interface to output a message based on the signal;
further wherein, the sensor operably senses a free region within the detection range, the free region being defined between the ground surface and a lower surface of the attachment.

* * * * *